(12) United States Patent
Oh

(10) Patent No.: US 8,340,100 B2
(45) Date of Patent: Dec. 25, 2012

(54) METHOD AND APPARATUS FOR CONTROLLING QUALITY OF SERVICE IN UNIVERSAL PLUG AND PLAY NETWORK

(75) Inventor: Seung-jae Oh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 97 days.

(21) Appl. No.: 12/168,307

(22) Filed: Jul. 7, 2008

(65) Prior Publication Data

US 2009/0052324 A1    Feb. 26, 2009

(30) Foreign Application Priority Data

Aug. 22, 2007    (KR) .................. 10-2007-0084523

(51) Int. Cl.
*H04L 12/56* (2006.01)
(52) U.S. Cl. ................................. 370/395.21
(58) Field of Classification Search .................. None
See application file for complete search history.

(56) References Cited

U.S. PATENT DOCUMENTS

| 2002/0143911 | A1 | 10/2002 | Vicente et al. | |
|---|---|---|---|---|
| 2004/0038685 | A1* | 2/2004 | Nakabayashi | 455/452.2 |
| 2007/0039037 | A1 | 2/2007 | Son et al. | |
| 2007/0058612 | A1 | 3/2007 | Bushmitch | |
| 2007/0153825 | A1 | 7/2007 | Cho et al. | |
| 2007/0189185 | A1* | 8/2007 | Chen et al. | 370/252 |
| 2007/0286074 | A1* | 12/2007 | Xu | 370/230 |
| 2008/0291930 | A1* | 11/2008 | Damola et al. | 370/401 |

FOREIGN PATENT DOCUMENTS

| CN | 1997014 A | 7/2007 |
|---|---|---|
| EP | 1892882 A1 | 2/2008 |
| KR | 1020060066980 A | 6/2006 |
| KR | 1020060106357 A | 10/2006 |
| KR | 10-0664943 B1 | 12/2006 |

OTHER PUBLICATIONS

UPnP QoS Architecture Version 2.0, Oct. 16, 2006.*
"UPnP QoS Architecture: 2, for UPnP Version 1.0", UPnPForum, 2006, pp. 1-33, http://www.upnp.org, English.
European Search Report issued on Jul. 30, 2010 in the corresponding European Patent Application No. 08793174.7.
Spenst, A. et., al. "An Implementation of the User-Centric QoS Management Approach in Wireless Home Networks", Wireless Communication Systems, 4th International Symposium. Oct. 1, 2007, pp. 107-112.
Choi, Sung-Gi, et., al. "An UPnP based Media Distribution System supporting QoS in a Converged Home Network", Network Operations and Management Symposium, Apr. 3, 2006, pp. 1-4.
Ditze, M. et., al. "Towards End-to-End QoS in Service Oriented Architectures", IEEE International Conference of Industrial Informatics (INDIN), Aug. 10, 2005, pp. 92-97.
Office Action issued Feb. 29, 2012 by the State Intellectual Property Office of the People's Republic of China in counterpart Chinese Application No. 200880103829.7.

* cited by examiner

*Primary Examiner* — Yong Zhou
(74) *Attorney, Agent, or Firm* — Sughrue Mion, PLLC

(57) ABSTRACT

A universal plug and play (UPnP) network is provided. In the UPnP network, a QoS policy holder of a UPnP QoS architecture manages information on QoS modes that are previously set, and a QoS manager controls QoS devices by importing traffic policies for a predetermined QoS mode from the QoS policy holder. Accordingly, a user can suitably control traffic items in the network only by selecting a desirable QoS mode according to situations.

17 Claims, 7 Drawing Sheets

| MOVIE | GAME | HOMEWORK | MUSIC |
|---|---|---|---|

| TRAFFIC | | PRIORITY |
|---|---|---|
| SOURCE | SINK | |
| MEDIA SERVER IN LIVING ROOM | TV IN LIVING ROOM | HIGH |
| STB | TV IN UPSTAIRS ROOM | LOW |
| PLAY STATION | TV IN UPSTAIRS ROOM | LOW |

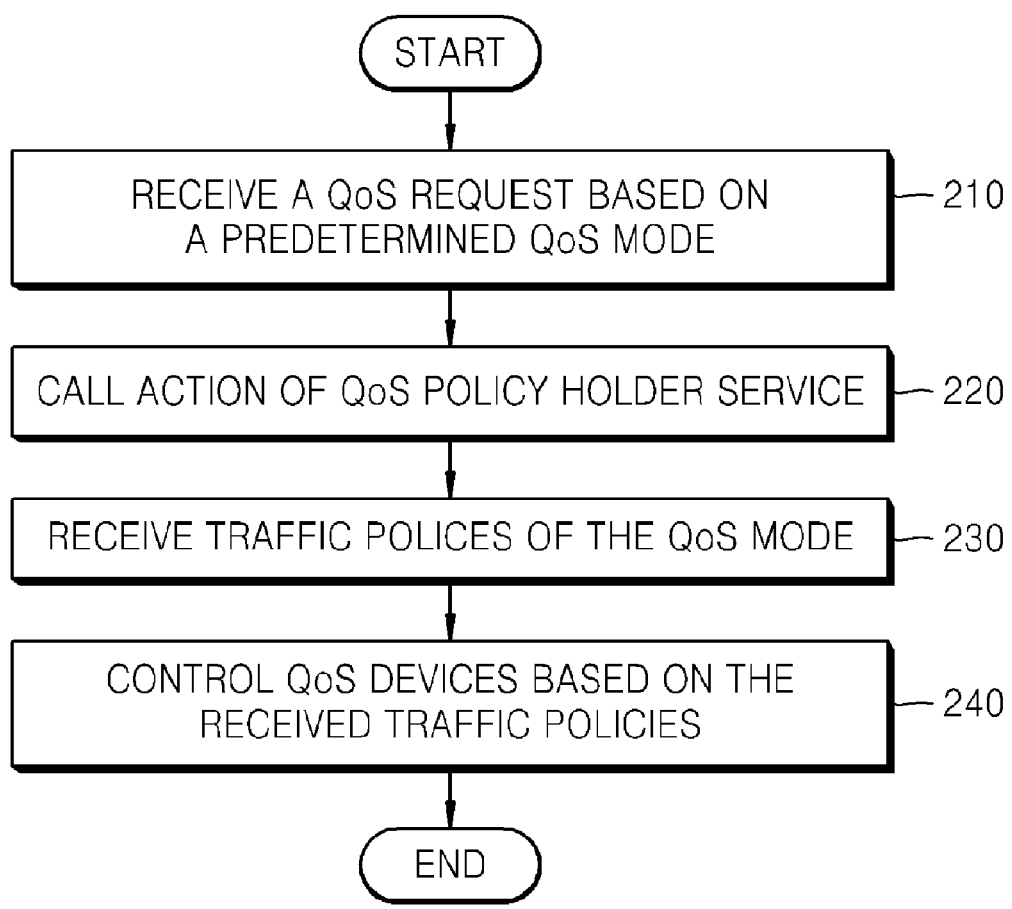

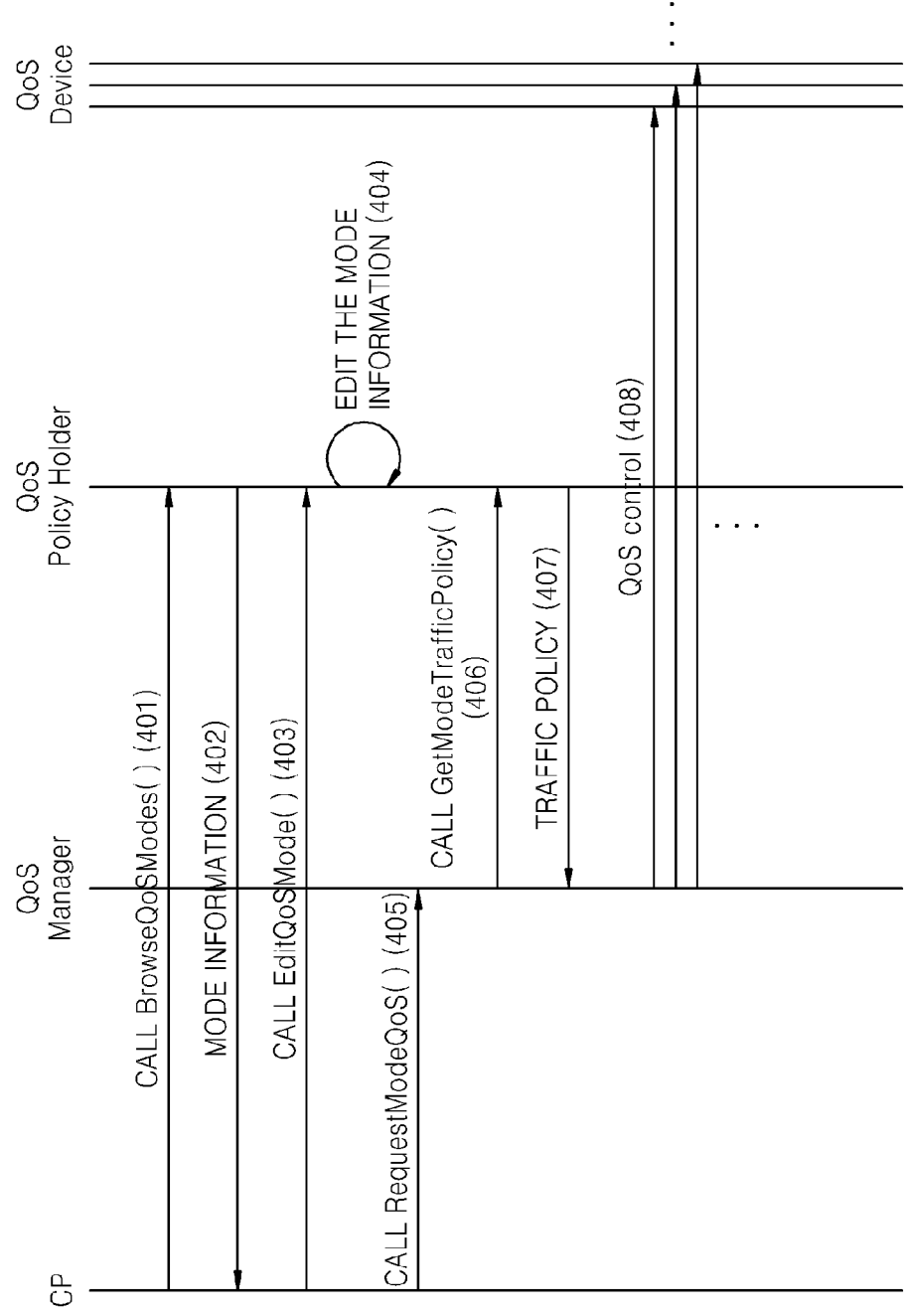

METHOD AND APPARATUS FOR CONTROLLING QUALITY OF SERVICE IN UNIVERSAL PLUG AND PLAY NETWORK

CROSS-REFERENCE TO RELATED PATENT APPLICATION

This application claims the benefit of Korean Patent Application No. 10-2007-0084523, filed on Aug. 22, 2007, in the Korean Intellectual Property Office, the disclosure of which is incorporated herein in its entirety by reference.

BACKGROUND OF THE INVENTION

1. Field of the Invention

The present invention relates to a home network, and more particularly, to a method of controlling Quality of Service (QoS) of a service provided by devices in a universal plug and play (UPnP) network.

2. Description of the Related Art

Universal plug and play (UPnP) is a protocol capable of finding and controlling electric appliances connected to a network. UPnP is used as a standard technique of home networking.

The UPnP QoS architecture is a standard for securing QoS for services in the network by controlling traffic communicated among a plurality of devices in the UPnP network. Services such as QoS device services, QoS policy holder services, QoS manager services, and the like are defined in the UPnP QoS architecture. The UPnP QoS architecture is used to use multimedia contents such as audio and video through a network.

FIG. 1A illustrates a UPnP network constructed with a device for providing a QoS device service (hereinafter, referred to as a QoS device), a device for providing a QoS policy holder service (hereinafter, referred to as a policy holder), and a device for providing a QoS manager service (hereinafter, referred to as a QoS manager). A user previously sets and stores a traffic policy (for example, priority) in a network in the policy holder. When a control point requests QoS for predetermined traffic to be secured, the QoS manager constructs a traffic descriptor by receiving traffic policy information and controls traffic of the QoS devices by using the traffic descriptor.

FIG. 1b is a flow diagram for illustrating a procedure in which UPnP QoS architecture elements communicate with one another.

The control point transmits information on traffic to which QoS is to be applied to the QoS manager by calling an action of RequestTrafficQos( ) of the QoS manager service. The transmitted information may include types of source devices, sink devices, and traffic.

The QoS manager acquires a traffic policy by calling an action of GetTrafficPolicy( ) defined in the QoS policy holder service based on the transmitted information. The traffic policy indicates information for controlling QoS for the traffic such as an admission policy, a traffic importance number, a user importance number, and the like. Since a detailed description of information constituting traffic elements is included in UPnP QoS architecture document, a detailed description thereof will be omitted. On the other hand, the QoS manager calls the actions of GetPathInformation( ), GetQoSDeviceInformation( ), and GetQoSState( ) defined in the QoS device service so as to recognize a path of the traffic and capability of devices located on the path of the traffic.

Finally, the QoS manager controls traffic of the QoS devices by calling an action of SetupTrafficQos( ) of the QoS device services based on the gathered information.

In the existing technique, since a traffic policy has to be set, there is a problem in that it is impossible to flexibly control the traffic of the network for different situations and different users. For example, when a user sets a priority level of video traffic transmitted from a media server located at an upstairs room to a television (TV) in a living room to the highest priority level, the video traffic has the highest priority level regardless of the situation, if a traffic policy for the video traffic is not changed. However, as an example, QoS of video traffic of a drama transmitted from a set-top box in the living room to a kitchen has to be previously set to coincide with a time for preparing a dinner. In a case where an urgent report has to be printed, data traffic transmitted to a printer is most important for the user. The existing technique is inconvenient because traffic policies have to be changed in the aforementioned cases.

SUMMARY OF THE INVENTION

The present invention provides a method and apparatus for flexibly controlling traffic of a QoS manager service in a network based on various QoS modes that are previously set by a user.

According to an aspect of the present invention, there is provided a method of allowing a universal plug and play (UPnP) device to provide a Quality of Service (QoS) manager service, the method comprising: receiving a QoS request based on a QoS mode from a control point; acquiring traffic policies that are previously set for a plurality of traffic items for the QoS mode from a QoS policy holder service; and controlling a plurality of QoS device services of the network based on the acquired traffic polices.

The receiving of the QoS request may comprise receiving a message for calling a predetermined action of the QoS manager service by using an identifier for representing the QoS mode as an input parameter from the control point, and the acquiring of the traffic policies may comprise: calling a predetermined action of the QoS policy holder service by using the identifier as an input parameter; and receiving traffic policies that are previously set for the QoS mode as an output parameter for the calling.

According to another aspect of the present invention, there is provided a computer-readable medium having embodied thereon a computer program for executing the method above.

According to another aspect of the present invention, there is provided an device for providing a Quality of Service (QoS) manager service in a universal plug and play (UPnP) network, the device comprising: a QoS request receiver receiving a QoS request based on a QoS mode from a control point; a traffic policy acquirer acquiring traffic policies that are previously set for a plurality of traffic items for the QoS mode from a QoS policy holder service; and a QoS controller controlling a plurality of QoS device services of the network based on the acquired traffic polices.

The QoS request receiver may receive a message for calling a predetermined action of the QoS manager service by using an identifier for representing the QoS mode as an input parameter from the control point, and the traffic policy acquirer may call a predetermined action of the QoS policy holder service by using the identifier as an input parameter and receives traffic polices that are previously set for the QoS mode as an output parameter, in response to the calling.

According to another aspect of the present invention, there is provided a method of providing a Quality of Service (QoS)

policy holder service in a universal plug and play (UPnP) network, the method comprising: receiving a request for traffic policies that are previously set for a QoS mode from a device for providing a QoS manager service; and transmitting traffic polices that are previously set for a plurality of traffic items for the QoS mode to the device.

The receiving of the request may include receiving a message for calling a predetermined action of the QoS policy holder service by using an identifier for representing the QoS mode as an input parameter from the device.

The method may further comprise: receiving a message for calling a predetermined action of the QoS policy holder service from a control point; and providing information on at least one selected from the group consisting of QoS mode names of all the QoS modes managed by the QoS policy holder, sink and source devices of traffic items, and priorities of traffic items to the control point, in response to the calling.

The method may further comprise: receiving a message for calling a predetermined action defined in the QoS policy holder service; and editing information on at least one QoS mode managed by the QoS policy holder service based on input parameters included in the received message.

According to another aspect of the present invention, there is provided a computer-readable medium having embodied thereon a computer program for executing the method above.

According to another aspect of the present invention, there is provided an apparatus for providing a Quality of Service (QoS) policy holder service in a universal plug and play (UPnP) network, the apparatus comprising: a traffic policy request receiver receiving a request for traffic policies that are previously set for a QoS mode from a device for providing a QoS manager service; and a traffic policy provider transmitting traffic policies that are previously set for a plurality of traffic items for the QoS mode to the device.

The traffic policy request receiver may receive a message for calling a predetermined action of the QoS policy holder service by using an identifier for representing the QoS mode as an input parameter from the device.

BRIEF DESCRIPTION OF THE DRAWINGS

The above and other features and advantages of the present invention will become more apparent by describing in detail exemplary embodiments thereof with reference to the attached drawings in which:

FIG. 2 is a flowchart of a procedure in which a UPnP device provides a QoS manager service according to an embodiment of the present invention;

FIG. 4 is a flowchart of a procedure in which UPnP QoS elements communicate with one another according to an embodiment of the present invention.

DETAILED DESCRIPTION OF THE INVENTION

The present invention will now be described more fully with reference to the accompanying drawings, in which exemplary embodiments of the invention are shown.

FIG. 2 is a flowchart of a procedure in which a UPnP device provides a QoS manager service according to an embodiment of the present invention.

In operation 210, a QoS manager receives a QoS request based on a predetermined QoS mode from a control point. This is a procedure in which the control point calls an action that is newly defined in the QoS manager service. At this time, an identifier of the QoS mode requested by the control point is used as an input parameter.

In operation 220, in order to acquire traffic policies for the QoS mode, the QoS manager calls an action that is newly defined in a QoS policy holder service according to the embodiment of the present invention. At this time, the identifier of the QoS mode is also used as an input parameter.

In operation 230, the QoS manager receives the traffic policies for the QoS mode from a QoS policy holder.

In operation 240, the QoS manager controls QoS device services based on the received traffic polices.

Figure 1A:
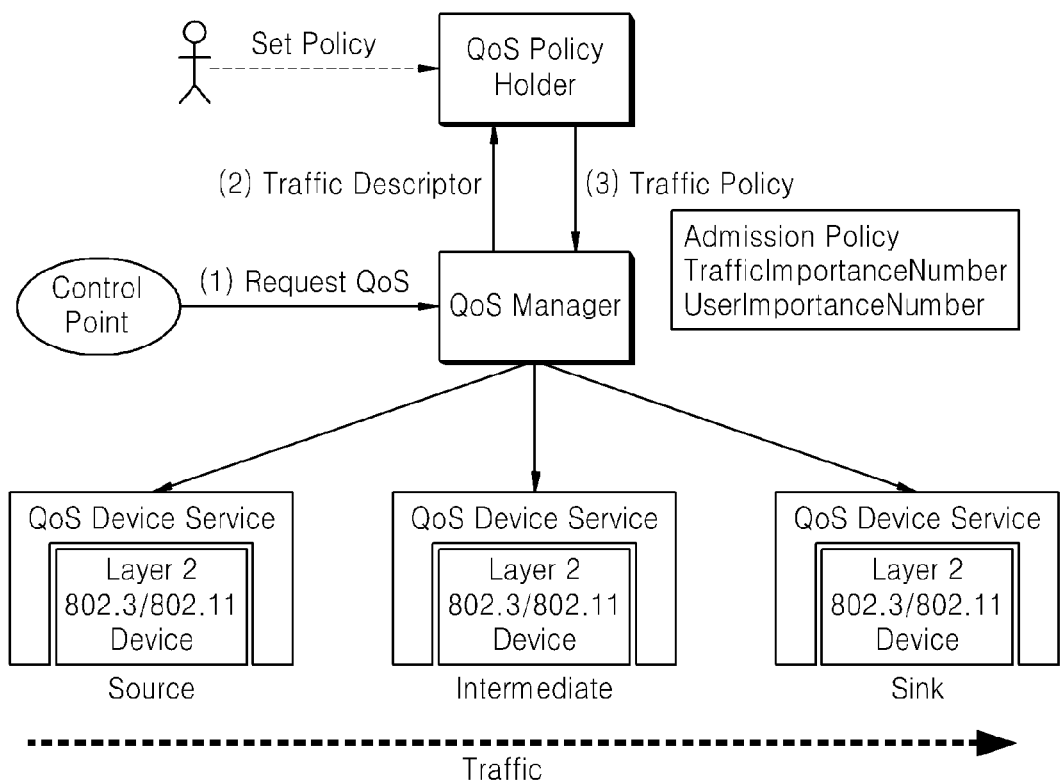
FIGS. 1A and 1B illustrate a procedure in which UPnP QoS architecture elements communicate with one another according to an existing technique.
Figure 1B:
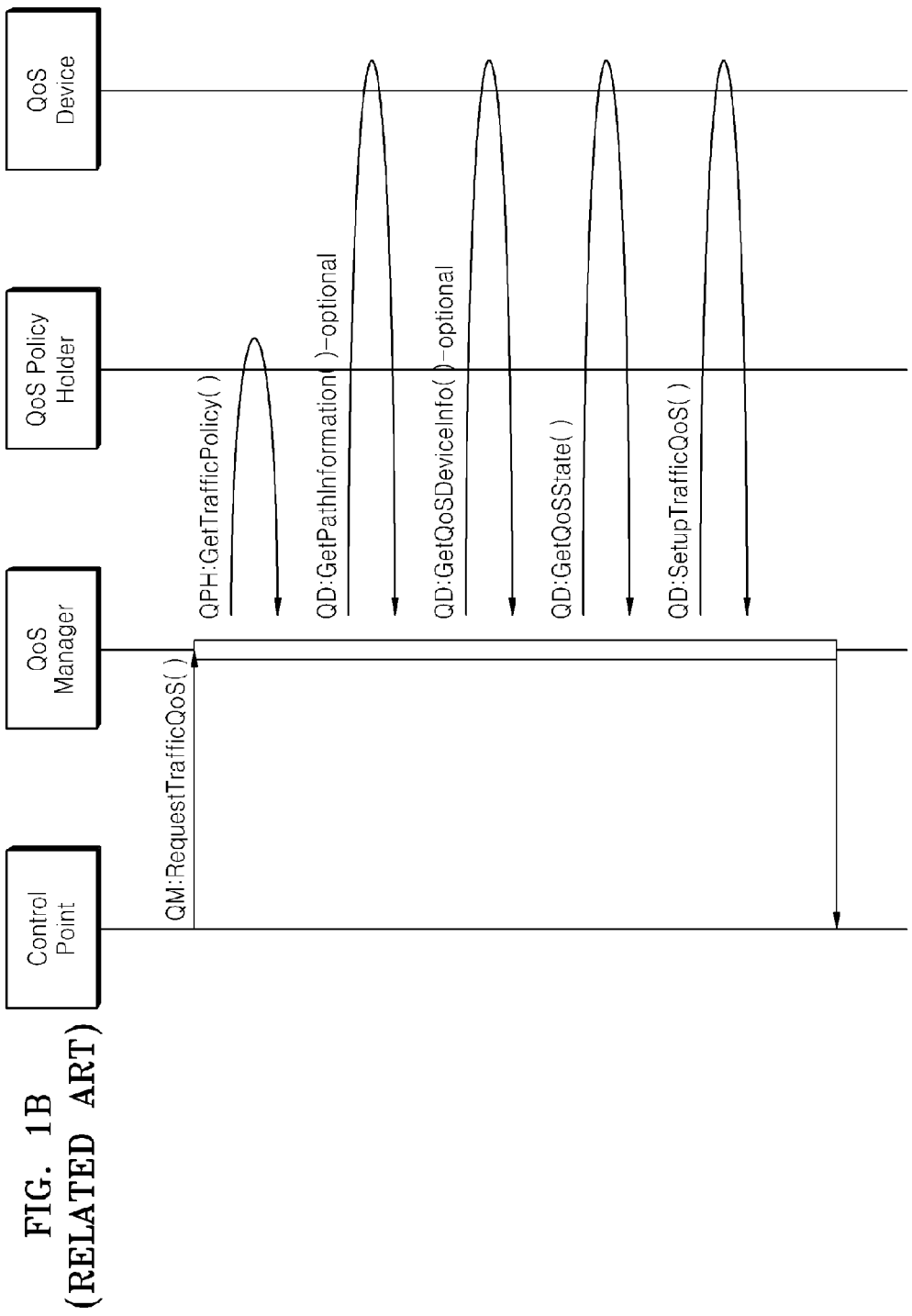
Figure 3A:
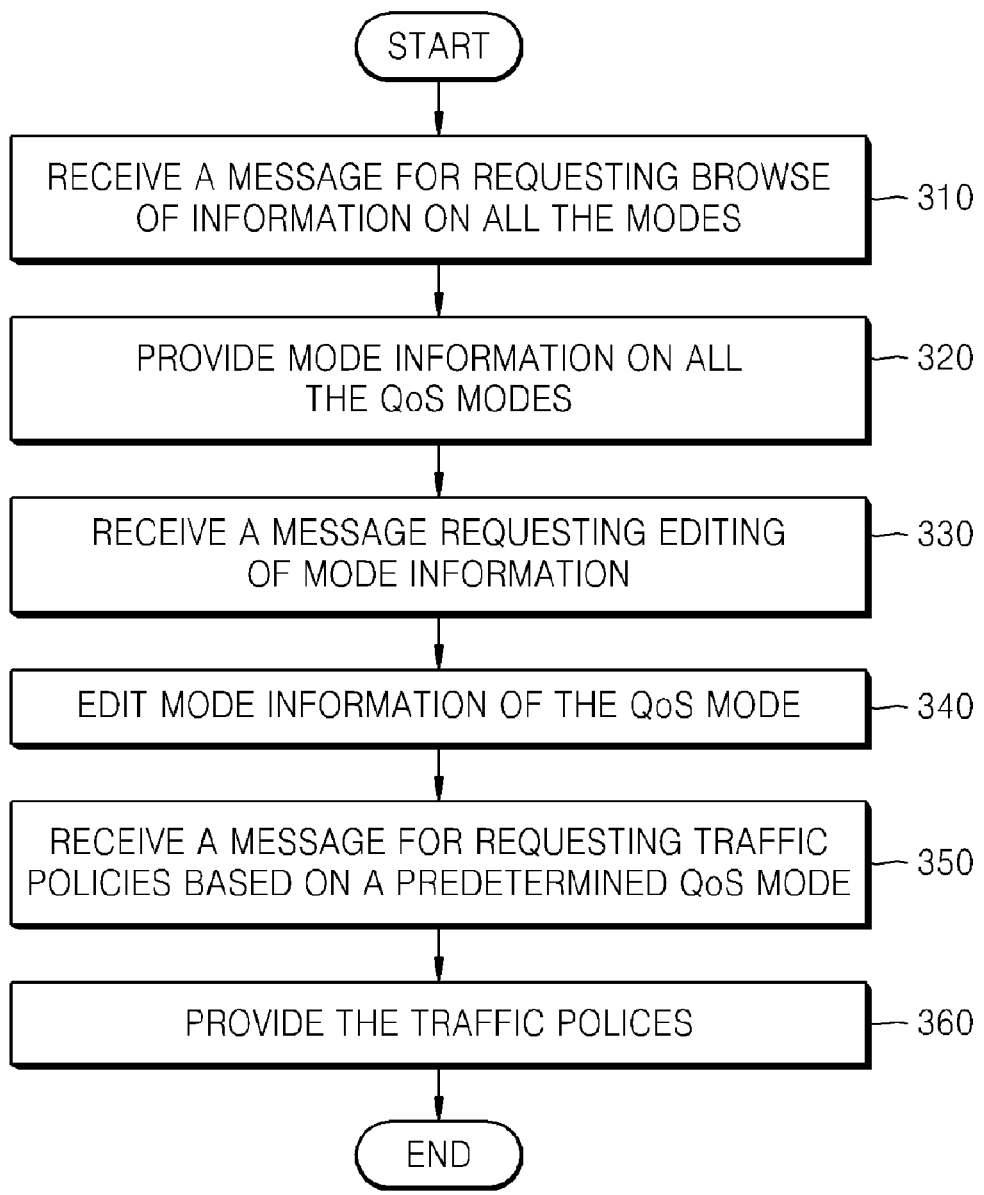
FIG. 3A is a flowchart of a procedure in which a UPnP device provides a QoS policy holder service according to an embodiment of the present invention.

FIG. 3A is a flowchart of a procedure in which a UPnP device provides a QoS policy holder service according to an embodiment of the present invention.

In operation 310, the QoS policy holder receives a message for requesting a browse of all the QoS modes managed by the QoS policy holder from the control point. This is a procedure in which the control point calls an action of the QoS policy holder service by using an identifier for the QoS mode as an input parameter. This action is newly defined in the QoS policy holder according to the embodiment of the present invention.

In operation 320, the QoS policy holder provides mode information on all the QoS modes. At this time, the mode information includes all the traffic policies for each QoS mode. Accordingly, mode information includes QoS mode names for traffic, source and sink devices of traffic, priority of traffic, and the like.

Figure 3B:
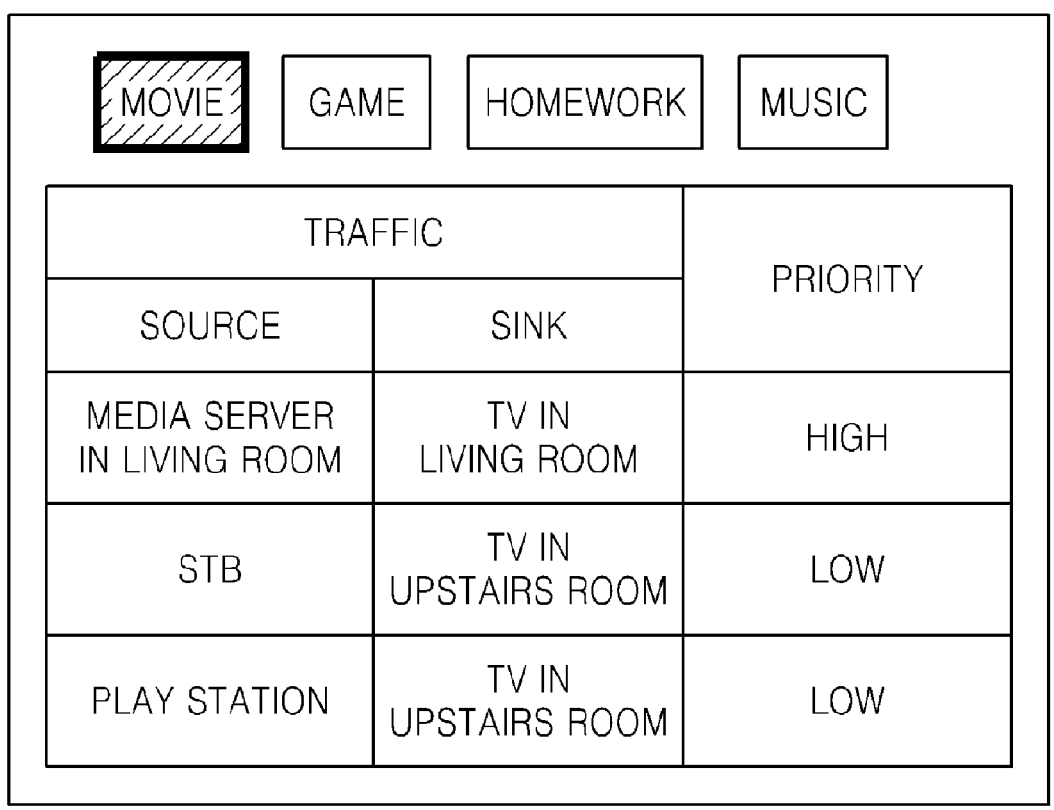
FIG. 3B illustrates a screen in which information on QoS modes is displayed to a user according to an embodiment of the present invention.

A user can edit the mode information through a user interface while viewing the mode information. FIG. 3B illustrates an example of the mode information displayed to the user. Referring to FIG. 3B, a priority level of traffic transmitted from a media server in a living room to a television (TV) in the living room is highest.

In operation 330, when the user modifies and deletes mode information of at least one QoS mode or generates a new mode through a user interface, the QoS policy holder receives a message for requesting the mode information to be edited. An action used for this case is newly defined in the QoS policy holder according the embodiment of the present invention.

In operation 340, the QoS policy holder edits the mode information of the QoS. That is, the mode information of the new QoS mode is generated, or the existing mode information is modified or deleted.

In operation 350, the QoS policy holder receives a message for requesting traffic policies that are set in a predetermined QoS mode from the control point. This is a procedure in which the QoS manager calls an action that is newly defined in the QoS policy holder service according to the embodiment of the present invention so as to acquire the traffic policies for the QoS mode.

In operation 360, the QoS policy holder provides traffic policies that are previously set for the QoS mode to the QoS manager.

FIG. 4 is a flowchart of a procedure in which UPnP QoS elements communicate with one another according to an embodiment of the present invention.

In operation 401, the control point calls an action of BrowseQoSModes( ) of the QoS policy holder service so as to browse QoS modes that are currently set.

In operation 402, the QoS policy holder returns mode information of all the QoS modes managed by the QoS policy holder. As described above, the mode information includes traffic policies for each QoS mode.

In operation 403, the control point calls an action of EditQoSMode( ) of the QoS policy holder service so as to edit the mode information.

In operation 404, the QoS policy holder generates a new QoS mode and mode information on the new QoS mode, or deletes or modifies the existing mode information, with reference to input parameters of the message that is received in operation 403.

In operation 405, the control point calls an action of RequestModeQoS( ) of the QoS manager service so as to set the traffic items of the network to a predetermined QoS mode.

In operation 406, the QoS manager calls an action of GetModeTrafficPolicy( ) of the QoS policy holder service so as to acquire traffic policies of the requested QoS mode.

In operation 407, the QoS policy holder returns the traffic policies that are set for the QoS mode.

In operation 408, the QoS manager controls QoS devices based on the traffic policies that are set for the QoS mode.

In the aforementioned procedures, BrowseQoSModes( ), EditQoSMode( ), RequestModeQoS( ), and GetModeTrafficPolicy( ) are newly defined actions according to the embodiment of the present invention.

Figure 5:
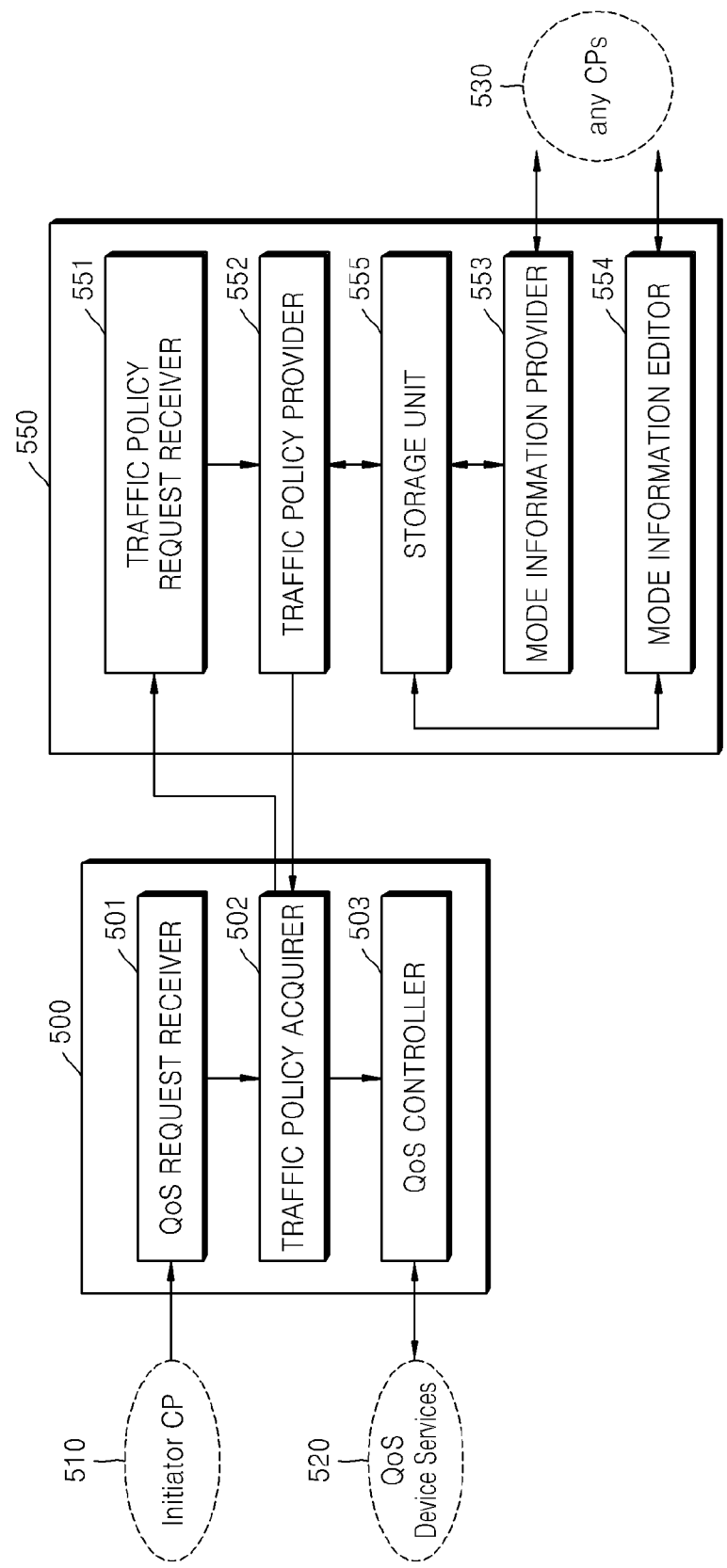
FIG. 5 illustrates a structure of a device for providing a UPnP QoS manager service and a structure of a device for providing a UPnP QoS policy holder service.

FIG. 5 illustrates a structure of a device 500 for providing a QoS manager service and a structure of a device 550 for providing a QoS policy holder service in a UPnP network according to an embodiment of the present invention.

The QoS manager 500 includes a QoS request receiver 501, a policy information acquirer 502, and a QoS controller 503. The QoS request receiver 501 receives a request for controlling traffic based on a predetermined QoS mode from a control point 510. At this time, an identifier for the QoS mode is input.

The traffic policy acquirer 502 imports the traffic policies that are previously set for the QoS mode from the QoS policy holder 550 by using the identifier.

The QoS controller 503 controls traffic of a UPnP network by controlling QoS device services 520 based on the traffic policies transmitted from the traffic policy acquirer 502.

The QoS policy holder 550 includes a traffic policy request receiver 551, a traffic policy provider 552, a storage unit 555, a mode information provider 553, and a mode information editor 554.

The traffic policy request receiver 551 receives a request for traffic policies for a predetermined QoS mode from the QoS manager 500. At this time, an identifier for the QoS mode is received as an input parameter.

The traffic policy provider 552 reads mode information of the QoS mode from the storage unit 555 in which information on traffic policies is stored by using the identifier. As described above, the mode information includes traffic policies of the QoS mode.

On the other hand, a user can browse mode information for all the QoS modes that are previously set by using any control point 530 in a UPnP network. The mode information provider 553 provides mode information stored in the storage unit 555 to the control point 530, in response to a request from the control point 530.

In addition, the user can edit the mode information stored in the storage unit 555 by using any control point 530 in the UPnP network. At this time, in order to prevent non-authorized users from modifying mode information, an authentication procedure may have to be passed. The mode information provider 553 generates a new QoS mode, or modifies or deletes mode information of the QoS mode that is previously set, in response to a request from the control point 530.

The embodiments of the present invention can be written as computer programs and can be implemented in general-use digital computers that execute the programs using a computer readable recording medium.

Examples of the computer readable recording medium include magnetic storage media (e.g., ROM, floppy disks, hard disks, etc.), and optical recording media (e.g., CD-ROMs, or DVDs).

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of allowing a universal plug and play (UPnP) device to provide a Quality of Service (QoS) manager service, the method comprising:
    receiving a QoS request based on a QoS mode from a control point, wherein the received QoS request comprises an identifier for representing the QoS mode from among a plurality of QoS modes;
    acquiring traffic policies that are previously set for a plurality of traffic items for the QoS mode from a QoS policy holder service, the QoS mode being among the plurality of QoS modes managed by a QoS policy holder; and
    controlling a plurality of QoS device services of the network based on the acquired traffic polices,
    wherein a first priority for a traffic item is acquired in response to the identifier representing a first QoS mode of the plurality of QoS modes, and a second priority, different from the first priority, for the traffic item is acquired in response to the identifier representing a second QoS mode of the plurality of QoS modes, and
    wherein each of the plurality of QoS modes corresponds to a plurality of traffic policies for the plurality of traffic items.

2. The method of claim 1,
    wherein the receiving of the QoS request comprises receiving a message for calling a predetermined action of the QoS manager service by using the identifier for representing the QoS mode as an input parameter from the control point, and
    wherein the acquiring of the traffic policies comprises:
    calling a predetermined action of the QoS policy holder service by using the identifier as an input parameter; and
    receiving traffic policies that are previously set for the QoS mode as an output parameter for the calling.

3. The method of claim 1, wherein:
    a first QoS mode of the plurality of modes sets a first priority to a first traffic item and a second priority to a second traffic item, and the first priority is higher than a second priority; and
    a second QoS mode of the plurality of modes sets a third priority to the first traffic item and a fourth priority to the second traffic item, and the fourth priority is higher than the third priority.

4. The method of claim 1, further comprising acquiring, for all of the plurality of QoS modes, traffic policies that are previously set for the plurality of traffic items from the QoS policy holder service.

5. The method of claim 4, wherein the acquiring, for each of the plurality of QoS modes, the traffic policies comprises acquiring the traffic policies in response to receiving a request to browse all of the plurality of QoS modes managed by the QoS policy holder service.

6. A non-transitory computer-readable recording medium having embodied thereon a computer program for executing a method of allowing a universal plug and play (UPnP) device providing a Quality of Service (QoS) manager service, the method comprising:
   receiving a QoS request based on a QoS mode from a control point, wherein the received QoS request comprises an identifier for representing the QoS mode from among a plurality of QoS modes;
   acquiring traffic policies that are previously set for a plurality of traffic items for the QoS mode from a QoS policy holder service, the QoS mode being among the plurality of QoS modes managed by a QoS policy holder; and
   controlling a plurality of QoS device services of the network based on the acquired traffic polices,
   wherein a first QoS mode of the plurality of QoS modes comprises a first priority for a traffic item is acquired in response to the identifier representing a first QoS mode of the plurality of QoS modes, and a second priority, different from the first priority, for the traffic item is acquired in response to the identifier representing a second QoS mode of the plurality of QoS modes, and
   wherein each of the plurality of QoS modes corresponds to a plurality of traffic policies for the plurality of traffic items.

7. A device for providing a Quality of Service (QoS) manager service in a universal plug and play (UPnP) network, the device comprising:
   a QoS request receiver receiving a QoS request based on a QoS mode from a control point, wherein the received QoS request comprises an identifier for representing the QoS mode from among a plurality of QoS modes;
   a traffic policy acquirer acquiring traffic policies that are previously set for a plurality of traffic items for the QoS mode from a QoS policy holder service, the QoS mode being among the plurality of QoS modes managed by a QoS policy holder; and
   a QoS controller controlling a plurality of QoS device services of the network based on the acquired traffic polices,
   wherein the traffic policy acquirer acquires a first priority for a traffic item in response to the identifier representing a first QoS mode of the plurality of QoS modes, and the traffic policy acquirer acquires a second priority, different from the first priority, for the traffic item in response to the identifier representing a second QoS mode of the plurality of QoS modes, and
   wherein each of the plurality of QoS modes corresponds to a plurality of traffic policies for the plurality of traffic items.

8. The device of claim 7,
   wherein the QoS request receiver receives a message for calling a predetermined action of the QoS manager service by using the identifier for representing the QoS mode as an input parameter from the control point, and
   wherein the traffic policy acquirer calls a predetermined action of the QoS policy holder service by using the identifier as an input parameter and receives traffic polices that are previously set for the QoS mode as an output parameter, in response to the calling.

9. A method of providing a Quality of Service (QoS) policy holder service in a universal plug and play (UPnP) network, the method comprising:
   receiving a request for traffic policies that are previously set for a QoS mode from a device for providing a QoS manager service, wherein the received request comprises an identifier for representing the QoS mode from among a plurality of QoS modes managed by a QoS policy holder; and
   transmitting traffic polices that are previously set for a plurality of traffic items for the QoS mode to the device,
   wherein a first priority for a traffic item is acquired in response to the identifier representing a first QoS mode of the plurality of QoS modes, and a second priority, different from the first priority, for the traffic item is acquired in response to the identifier representing a second QoS mode of the plurality of QoS modes, and
   wherein each of the plurality of QoS modes corresponds to a plurality of traffic policies for the plurality of traffic items.

10. The method of claim 9, wherein the receiving of the request includes receiving a message for calling a predetermined action of the QoS policy holder service by using the identifier for representing the QoS mode as an input parameter from the device.

11. The method of claim 9, further comprising:
    receiving a message for calling a predetermined action of the QoS policy holder service from a control point; and
    providing information on at least one selected from the group consisting of QoS mode names of all the QoS modes managed by the QoS policy holder, sink and source devices of traffic items, and priorities of traffic items to the control point, in response to the calling.

12. The method of claim 9, further comprising:
    receiving a message for calling a predetermined action defined in the QoS policy holder service; and
    editing information on at least one QoS mode managed by the QoS policy holder service based on input parameters included in the received message.

13. A non-transitory computer-readable recording medium having embodied thereon a computer program for executing a method of providing a Quality of Service (QoS) policy holder service in a universal plug and play (UPnP) network, the method comprising:
    receiving a request for traffic policies that are previously set for a QoS mode from a device for providing a QoS manager service, wherein the received request comprises an identifier for representing the QoS mode from among a plurality of QoS modes managed by a QoS policy holder; and
    transmitting traffic polices that are previously set for a plurality of traffic items for the QoS mode to the device,
    wherein a first priority for a traffic item is transmitted in response to the identifier representing a first QoS mode of the plurality of QoS modes, and a second priority, different from the first priority, for the traffic item is transmitted in response to the identifier representing a second QoS mode of the plurality of QoS modes, and
    wherein each of the plurality of QoS modes corresponds to a plurality of traffic policies for the plurality of traffic items.

14. An apparatus for providing a Quality of Service (QoS) policy holder service in a universal plug and play (UPnP) network, the apparatus comprising:

a traffic policy request receiver receiving a request for traffic policies that are previously set for a QoS mode from a device for providing a QoS manager service, wherein the received request comprises an identifier for representing the QoS mode from among a plurality of QoS modes managed by the apparatus; and a traffic policy provider transmitting traffic policies that are previously set for a plurality of traffic items for the QoS mode to the device, wherein the traffic policy provider transmits a first priority for a traffic item in response to the identifier representing a first QoS mode of the plurality of QoS modes, and the traffic policy provider transmits a second priority, different from the first priority, for the traffic item in response to the identifier representing a second QoS mode of the plurality of QoS modes, and wherein each of the plurality of QoS modes corresponds to a plurality of traffic policies for the plurality of traffic items.

15. The apparatus of claim 14, wherein the traffic policy request receiver receives a message for calling a predetermined action of the QoS policy holder service by using the identifier for representing the QoS mode as an input parameter from the device.

16. The apparatus of claim 14, further comprising a mode information provider providing information on at least one selected from the group consisting of QoS mode names of all the QoS modes managed by the QoS policy holder, sink and source devices of traffic items, and priorities of traffic items to the control point, in response to the calling, when receiving message for calling a predetermined action of the QoS policy holder service.

17. The apparatus of claim 14, further comprising a mode information modifier editing information on at least one QoS mode managed by the QoS policy service based on input parameters included in the message, when receiving a message for calling a predetermined action defined in the QoS policy holder service.

* * * * *